Figure 1:
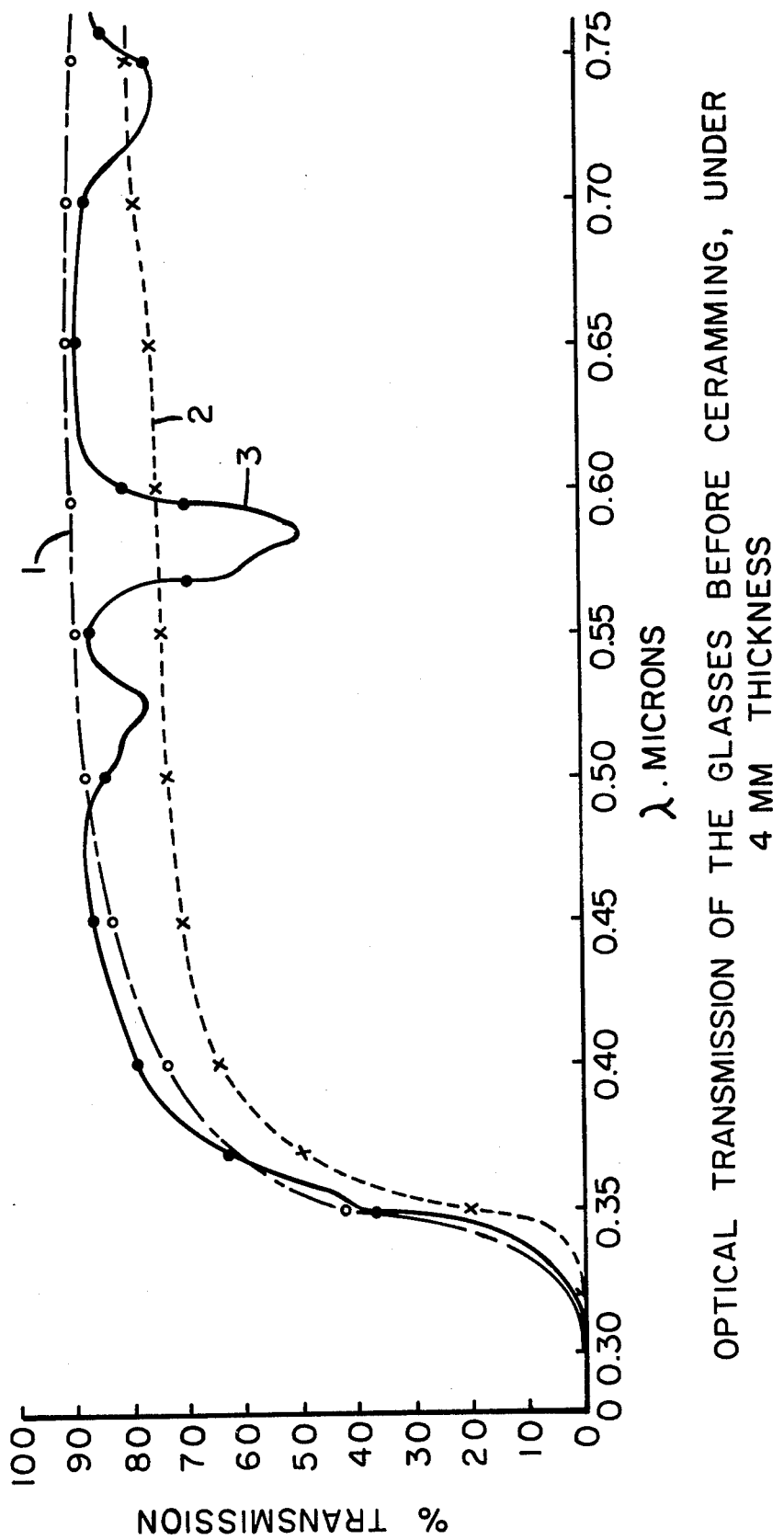

United States Patent [19]

Boitel et al.

[11]  4,093,468
[45]  June 6, 1978

[54] PROCESS TO OBTAIN TRANSPARENT COLORLESS AND GLASS-CERAMICS SO OBTAINED

[75] Inventors: Marius Charles Boitel, Avon; Serge Andre Maurice Renault, Montigny sur Loing, both of France

[73] Assignee: Corning Glass Works, Corning, N.Y.

[21] Appl. No.: 780,513

[22] Filed: Mar. 23, 1977

[51] Int. Cl.² .......................... C03C 3/22; C03C 3/04
[52] U.S. Cl. .................................... 106/39.7; 106/39.8
[58] Field of Search ............................... 106/39.8, 39.7

[56] References Cited

U.S. PATENT DOCUMENTS

| | | | |
|---|---|---|---|
| 3,928,229 | 12/1975 | Neuroth | 106/39.6 |
| 4,018,612 | 4/1977 | Chyung | 106/39.8 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The invention relates to glass-ceramics.

It concerns a process to obtain sensibly colorless transparent glass-ceramics from a glass-ceramic composition containing more than 0.50 weight % titanium dioxide and possibly iron oxide, that would normally provide colored glass-ceramics; this process is characterized by incorporating into the said composition an appropriate proportion of neodymium oxide so as to make the glass-ceramic sensibly colorless.

Application to the manufacture of diverse articles.

2 Claims, 2 Drawing Figures

PROCESS TO OBTAIN TRANSPARENT COLORLESS AND GLASS-CERAMICS SO OBTAINED

This invention is concerned with the decolorizing of glass-ceramics, and particularly a means for decolorizing transparent glass-ceramics containing titanium-dioxide.

It is known that numerous glass compositions can give, after a well choosen thermal treatment, a transparent glass-ceramic. As examples, some of these compositions are described in French Pat. Nos. 1,221,174 and 1,562,377. These transparent glass-ceramics are composed of a residual glassy matrix encompassing very small crystals. According to glass composition and thermal treatment these crystals may be mixed crystals having the structure of beta-quartz (or mixed crystals of beta-eucryptite), spodumene, zinc spinel, celsian, aluminum titanate, zirconia, rutile and some others.

In these transparent glass-ceramics, one often finds a certain amount of titanium oxide, this last playing a role of prime importance in the forming of crystalline nuclei which are necessary to obtain the desired crystalline structures. Titanium oxide presents the drawback of giving to transparent glass-ceramics containing it an amber tint that can be considered as unpleasant for some applications. For instance, for the manufacturing of ware such as casseroles, coffee-pots, etc., the amber tint may change the colour aspect of food and drinks contained in the vessel unpleasantly. In this sort of article, the problem becomes particularly acute by the fact that production cost constraints lead to the use of impure raw materials containing a certain quantity of iron oxide and the interaction of these two oxides, of iron and of titanium, increases the amber tint of the glass-ceramic.

Some compositions have been proposed to avoid this tint, by suppressing $TiO_2$ or reducing its amount to a very low value. For example, these are the glass-ceramics described in French Pat. Nos. 1,337,180 and 1,421,662. These solutions are not entirely satisfactory because the replacement of $TiO_2$ by others oxides, such as $ZrO_2$, is accomplished to the detriment of manufacturing conditions: melting, forming, ceramming time, or of some interesting properties of the material: low coefficient of thermal expansion, low diffusion of light etc. This demonstrates the interest to be found in neutralizing the coloration coming from $TiO_2$.

In glass technology it is known that we can neutralize an undesirable tint coming from an impurity with a colouring element producing a complementary tint in the glass. As an example the yellowish tint that would be produced in lead crystal by iron oxide contained as an impurity in raw materials is neutralized by an appropriate amount of cobalt and nickel oxides. In fact the result is a larger absorption of the light, but this absorption is balanced so as to constitute a neutral tint practically invisible.

The French Pat. No. 1,474,728 describing a certain number of transparent of opaque coloured glass-ceramics shows that the normal colouring oxides used in glass technology give unexpected colours in glass-ceramics. It can thus be anticipated that oxides used for decolorizing glasses will not give the normal decolorizing effect when one uses them in glass-ceramics.

This has been confirmed with transparent glass-ceramics wherein the predominant crystal phase is a beta-quartz solid solution, and with compositions encompassed within the following range:

$SiO_2$, 60 to 70%; $LiO_2$, 3 to 4%; $Al_2O_3$, 15 to 25%; $TiO_2$, 2 to 6% the raw materials of which contained about 500 parts per million of $Fe_2O_3$. The glass before ceramming could be made colourless with any one of the three following additions, in weight percent:

Addition number 1: 0.0025 to 0.005% CoO
Addition number 2: 0.25 to 0.50% $SeO_3Zn$
Addition number 3: 0.0025% CoO + 0.010% CuO However after ceramming additions numbers 1 and 3 give different shades of purple which may change from pink to brown, whilst addition number 2 scarcely masks the usual amber tint of the titanium glasses.

Thus none of the usual colouring agents, particularly Co, Cr, Cu, Mn, Ni, V give, after ceramming, a tint capable of masking the tint coming from titanium and iron oxides.

There is a need therefore for a process of neutralization of the tint conferred to glass-ceramics by titanium and iron oxides. The present invention is designed to satisfy that need.

The invention is concerned with a process to obtain sensibly colourless transparent glass-ceramics, starting from a glass-ceramic composition containing titania in a proportion superior to 0.50% by weight and possibly ferric oxide that would normally provide coloured glass-ceramics; this process is characterized by the fact that an adequate proportion of neodymium oxide is incorporated in the composition. The proportion of neodymium oxide to be incorporated will vary with the particular composition of the glass-ceramic, particularly with the amount of $TiO_2$ and $Fe_2O_3$ present. Trials with different additions of neodymium oxide should be made for each particular composition, for example in the manner indicated in the illustrative examples given hereafter.

Generally too low an addition of neodymium oxide will lead to glass-ceramics with a yellow tint, whilst too high an addition will lead to blue violet tinted glass-ceramics.

Normally the proportion of neodymium oxide to be incorporated will lie within 0.03% and 0.75% by weight, although additions superior to 0.75% may be necessary in some cases.

This invention relates also to transparent sensibly colourless glass-ceramics, the composition of which contains, on the basis of oxides and as calculated from the starting batch, at least 0.50% by weight of titanium dioxide and possibly ferric oxide, characterized by the fact that the said composition contains an appropriate proportion of neodymium oxide to make the glass-ceramic sensibly colourless.

The following non-limiting examples are given as illustration and for a better understanding of the present invention, with reference to the drawings wherein:

FIG. 1 is a graph showing light transmission curves as a function of wave-length of a base glass for glassceramics without additive (curve 1), with addition of cobalt oxide (curve 2) and with addition of neodymium oxide (curve 3).

Figure 2:
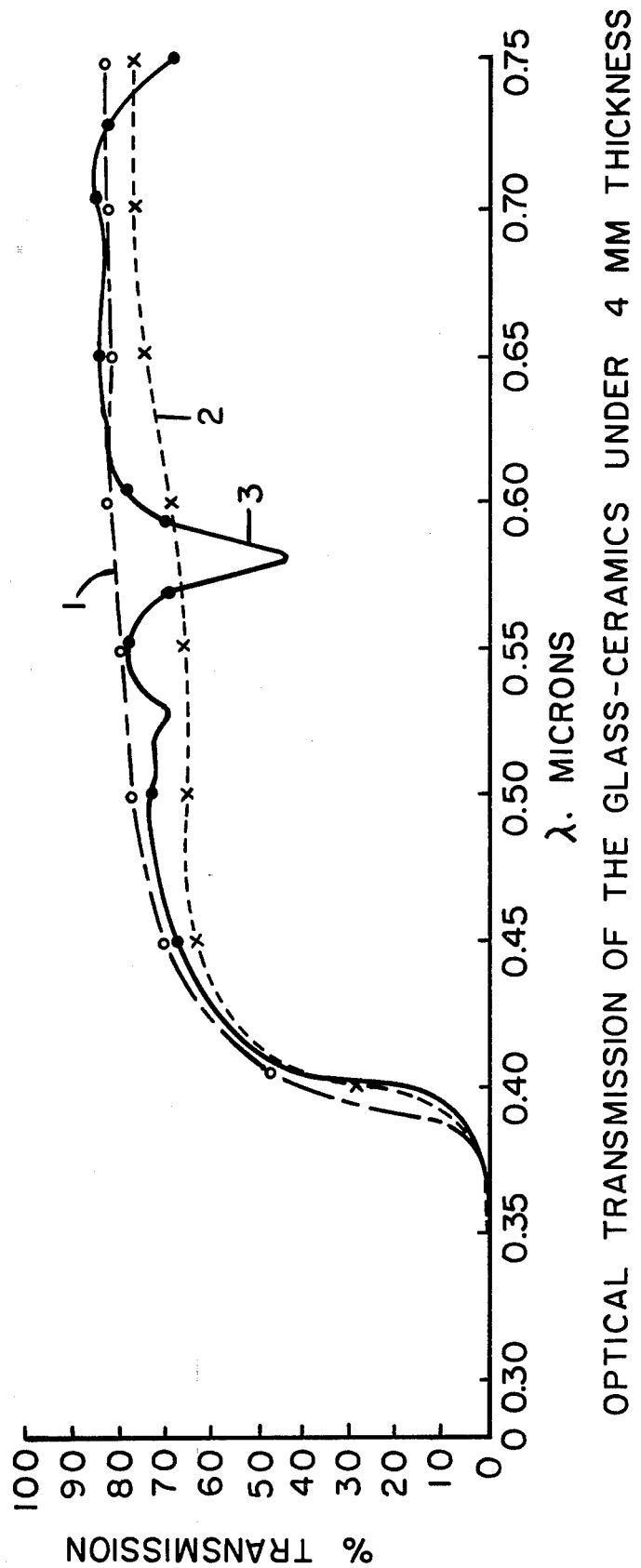

FIG. 2 is a graph similar to that of FIG. 1, but after ceramming the base glasses.

EXAMPLE NO. 1

A. The glass used has the following composition, in weight percent:

$SiO_2$, 60; $TiO_2$, 6; $Al_2O_3$, 24; $Fe_2O_3$, 0.02; $Li_2O$, 3.5; $P_2O_5$, 4

This glass is melted at 1600° C. for 24 hours in a 1 liter silica crucible to avoid any influence that a crucible made of rhodium platinum could have on the tint. Its colour is characterized by transmission curve No. 1 of FIG. 1; it can be designated as very pale yellow. A sample of this glass is treated for 2 hours at 870° C. to change it into a transparent glass-ceramic containing around 90% crystal phase which is mainly a beta-quartz solid solution. The colour of this glass-ceramic is characterized by curve No. 1 of FIG. 2: it looks amber.

B. The same base glass composition is melted with the addition of 0.004% of cobalt oxide CoO. The colours before and after ceramming are characterized by curves No. 2 of FIGS. 1 and 2 respectively. Visually the sample appears colourless before ceramming and purple after ceramming. By comparing the curves No. 2 of FIGS. 1 and 2, we notice a strong modification in the form during ceramming. Although at about 0.65 micron transmission remains unchanged it decreases by about 10% at about 0.50 micron, which explains the evolution of the tint.

C. The same base glass composition is melted with the addition of 0.3% of neodymium oxide $Nd_2O_3$.

The colours before and after ceramming are characterized by the curves No. 3 of FIGS. 1 and 2 respectively. Visually the sample seems colourless before and after ceramming. By comparing curves No. 3 of FIGS. 1 and 2, one notices the low modification of the absorption bands of $Nd_2O_3$ during ceramming contrary to the previous case.

The thermal expansion coefficient of this glass-ceramic is less than $15 \times 10^{-7}/K$.

The phenomenon from which the present invention derives benefits for decolorizing transparent glass-ceramics containing titanium dioxide is not yet completely elucidated.

However without limiting the present invention to any theory, the applicant proposes two hypotheses.

The first hypothesis consists in attributing the stability of the light absorption of rare earth oxides to the stability of their valence and coordination in the glass, contrary to the other colouring oxides which easily change their valence and coordination according to their surroundings. The second hypothesis consists in attributing the stability of the absorption of rare earth oxides to the ionic radius of the metallic ion. In effect the other metals used in the past to colour or to decolorize glasses have ionic radii inferior to 0.9A, which allows them, theoretically, to be substituted for lithium within the beta-quartz solid solution. We can assume that the fact of being a part of this crystal changes their electronic structure, and hence their absorption. On the contrary, the ionic radius of neodymium is equal to 1.04A, so that it would be obliged to remain in the glassy matrix where it would keep the same properties as in glasses.

EXAMPLE NO. 2

This example illustrates the method of determining experimentally the proportion of neodymium oxide to be incorporated into the composition of a transparent glass-ceramic so as to obtain a colourless glass-ceramic. According to an operation mode similar to Example No. 1, one prepares a series of glass-ceramics having the basic compositions A, B, C and D indicated in Table 1, and containing diverse proportions of $Fe_2O_3$ and $Nd_2O_3$. The colours obtained before and after ceramming are also indicated in the following table.

According to the following table, one sees that glass-ceramics having the basic composition A at 3% $TiO_2$ can be decolorized by the incorporation of $Nd_2O_3$ at 0.20% when they contain 140 ppm $Fe_2O_3$ (trial No. 3) and by the incorporation of about 0.35% $Nd_2O_3$ when they contain 380 ppm $Fe_2O_3$ (as determined by interpolation between trials No. 8 and 9).

Glass-ceramics having the composition B at 1.8% $TiO_2$ can be decolorized by the incorporation of 0.15% $Nd_2O_3$ when they contain 100 ppm $Fe_2O_3$ (trial No. 14) and by an incorporation of 0.25% $Nd_2O_3$ when they contain 350 ppm $Fe_2O_3$ (trial No. 19). Glass-ceramics having the basic composition C with 6% $TiO_2$ and a rather high amount of $P_2O_5$ can be decolorized by the incorporation of about 0.40% $Nd_2O_3$ when they contain 160 ppm $Fe_2O_3$ (as determined by interpolation between trials No. 22 and No. 23). Glass-ceramics having the basic composition D with 4.0% $TiO_2$ and a rather high amount of $P_2O_5$ can be decolorized by the incorporation of 0.25% $Nd_2O_3$ when they contain 160 ppm $Fe_2O_3$ (trial No. 25) and by the incorporation of 0.32% $Nd_2O_3$ when they contain 440 ppm $Fe_2O_3$ (as determined by interpolation between trials No. 27 and No. 28).

As we can see according to the above results, the proportion of neodymium oxide to be incorporated in the basic composition to obtain a colourless transparent glass-ceramic varies with the amount of titanium dioxide and with the amount of ferric oxide (present as impurities in raw materials or refractories used in manufacturing equipment) and with the base composition of the glass-ceramic. It is practically impossible, therefore, to forecast what proportion of $Nd_2O_3$ will have to be added to a glass-ceramic composition to obtain a colourless glass-ceramic. It will be generally necessary therefore, to prepare a series of composition with increasing additions of $Nd_2O_3$ to be able to determine, either directly from the results obtained, or by interpolation, the appropriate amount of neodymium oxide to be incorporated to get the desired decolorizing effect.

Obviously the decolorizing effect could be obtained with compositions of glass-ceramics different from those specifically described in the above examples and the invention is not limited to those particular compositions.

Generally, the invention can be applied to all transparent glass-ceramic compositions containing titanium dioxide and if such should be the case other colouring materials such as $Fe_2O_3$, whether these materials have an accidental origin or they have been intentionally introduced in order to improve certain properties of the glass-ceramics.

TABLE

| Basic Composition Weight % | | Amount $Fe_2O_3$ ppm | $Nd_2O_3$ wt. % | Trial No. | Colour Before Ceramming | Color After Ceramming |
|---|---|---|---|---|---|---|
| A | | | 0 | 1 | Yellow | Yellow |
| $SiO_2$ | 69.4 | | 0.1 | 2 | Pale yellow | Yellow |
| $Al_2O_3$ | 18.7 | | | | | |
| $Li_2O$ | 3.5 | | 0.2 | 3 | Colourless | Colourless |
| MgO | 1.8 | 140 | | | | |
| BaO | — | | 0.3 | 4 | Very pale violet to pink | Very pale Violet to very pale pink |
| ZnO | 0.8 | | | | | |

TABLE-continued

| Basic Composition Weight % | | Amount Fe$_2$O$_3$ ppm | Nd$_2$O$_3$ wt. % | Trial No. | Colour Before Ceramming | Color After Ceramming |
|---|---|---|---|---|---|---|
| TiO$_2$ | 3.0 | | 1.0 | 5 | Pale violet | Pale violet |
| ZrO$_2$ | 2.0 | | 0 | 6 | Yellow | Dark yellow |
| P$_2$O$_5$ | — | | 0.2 | 7 | Yellow | Yellow |
| As$_2$O$_3$ | 0.8 | | 0.3 | 8 | Very pale yellow | Very pale yellow |
| | | 380 | 0.4 | 9 | Colourless to very pale pink | Colourless to very pale pink |
| | | | 1.0 | 10 | Pale violet | Pale violet |
| B | | | | | | |
| SiO$_2$ | 62.0 | | 0 | 11 | Pale Yellow | Yellow |
| Al$_2$O$_3$ | 21.3 | | 0.05 | 12 | Pale yellow | Yellow |
| Li$_2$O | 2.7 | | | | | |
| MgO | 1.0 | 100 | 0.1 | 13 | Very pale yellow | Very pale yellow |
| BaO | 1.3 | | 0.15 | 14 | Colourless | Colourless |
| CaO | 0.5 | | | | | |
| ZnO | 6.0 | | 0.30 | 15 | Pale violet | Pale violet |
| TiO$_2$ | 1.8 | | | | | |
| ZrO$_2$ | 2.0 | | 0 | 16 | Yellow | Darker yellow |
| P$_2$O$_5$ | 0.7 | | 0.1 | 17 | Pale yellow | Yellow |
| As$_2$O$_3$ | 0.7 | 350 | 0.2 | 18 | Very pale yellow | Pale yellow |
| | | | 0.25 | 19 | Colourless | Colourless |
| | | | 0.40 | 20 | Pale violet | Pale violet |
| C | | | | | | |
| SiO$_2$ | 61.0 | 160 | 0 | 21 | Yellow | Yellow |
| Al$_2$O$_3$ | 23.0 | | 0.35 | 22 | Colourless | Very pale yellow to colourless |
| Li$_2$O | 3.5 | | | | | |
| MgO | 0.1 | | 0.5 | 23 | Pale violet | Pale violet |
| ZnO | 0.3 | | | | | |
| TiO$_2$ | 6.0 | | | | | |
| ZrO$_2$ | 1.5 | | | | | |
| P$_2$O$_5$ | 4.0 | | | | | |
| As$_2$O$_3$ | 0.6 | | | | | |
| D | | | 0 | 24 | Pale yellow | Yellow |
| SiO$_2$ | 61.2 | | | | | |
| Al$_2$O$_3$ | 24.0 | 160 | 0.25 | 25 | Colourless | Colourless |
| Li$_2$O | 3.4 | | | | | |
| MgO | — | | 0.35 | 26 | Pale violet | Pale violet |
| ZnO | 0.5 | | 0.25 | 27 | pale yellow | Pale yellow |
| TiO$_2$ | 4.0 | | | | | |
| ZrO$_2$ | 2.0 | 440 | 0.35 | 28 | Colourless | Colourless to very pale violet |
| P$_2$O$_5$ | 4.2 | | | | | |
| As$_2$O$_3$ | 0.7 | | 0.50 | 29 | Pale violet | Pale violet |

We claim:

1. Sensibly colorless transparent glass-ceramics wherein beta-quartz solid solution constitutes the predominant crystal phase having base compositions within the Li$_2$O-Al$_2$O$_3$-SiO$_2$ field which contain, on the basis of oxides and as calculated from the batch, about 0.5–6% by weight TiO$_2$, an amount of Fe$_2$O$_3$ up to about 500 ppm, and about 0.03–0.75% by weight Nd$_2$O$_3$.

2. Sensibly colorless transparent glass-ceramics according to claim 1 having base compositions consisting essentially, in weight percent on the basis of oxides and as calculated from the batch, of about 3–4% Li$_2$O, 15–25% Al$_2$O$_3$, and 60–70% SiO$_2$.

* * * * *